I. D. BATE.
AXLE.
APPLICATION FILED FEB. 15, 1916.
1,190,706.
Patented July 11, 1916.
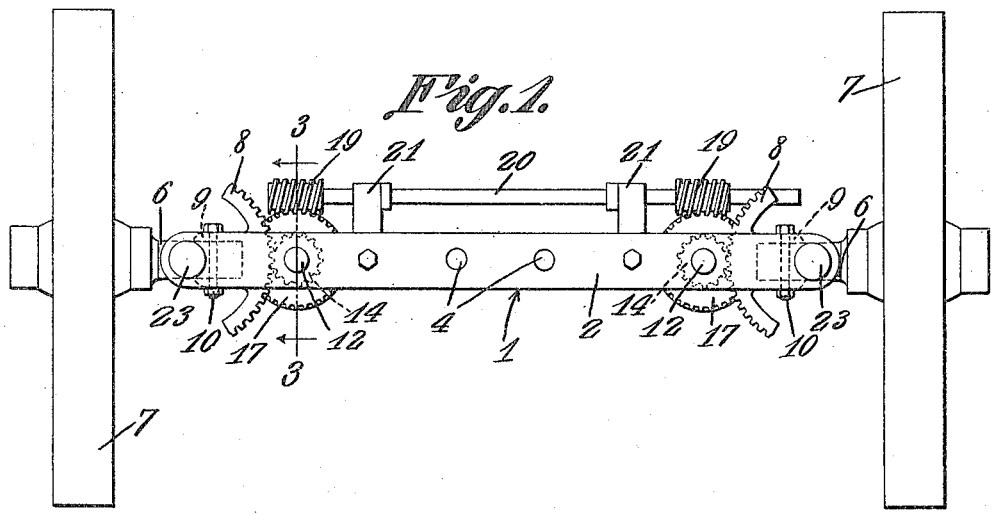
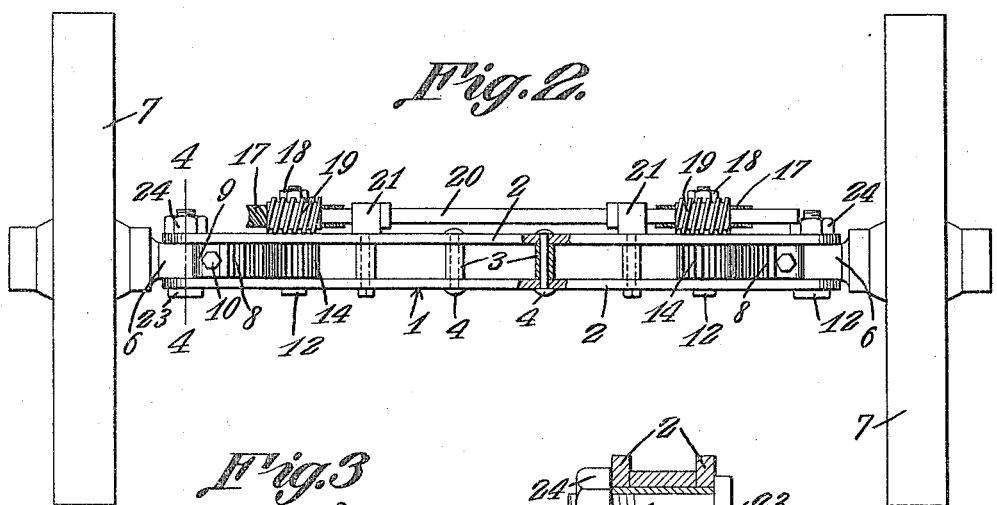
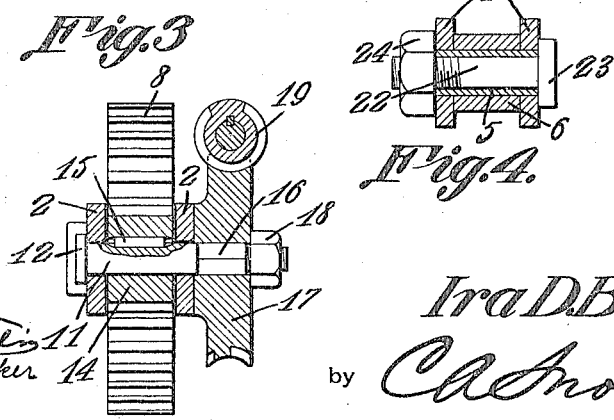
Witnesses
Ira D Bate, Inventor
by
Attorneys

UNITED STATES PATENT OFFICE.

IRA D. BATE, OF WEST JEFFERSON, OHIO.

AXLE.

1,190,706. Specification of Letters Patent. Patented July 11, 1916.

Application filed February 15, 1916. Serial No. 78,480.

*To all whom it may concern:*

Be it known that I, IRA D. BATE, a citizen of the United States, residing at West Jefferson, in the county of Madison and State of Ohio, have invented a new and useful Axle, of which the following is a specification.

The device forming the subject matter of this application is an axle adapted to constitute a part of a hay-baler, a corn husker, a road grader, or other vehicle which traverses a field or a highway, and the invention aims to provide novel means whereby, when the surface which the vehicle is traveling slants transversely of the line of advance of the vehicle, the ground wheels will be permitted to stand vertically, and not at right angles to the inclined surface along which the vehicle is moving.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawing: Figure 1 shows in elevation, a vehicle axle constructed in accordance with the present invention; Fig. 2 is a top plan of the structure shown in Fig. 1; Fig. 3 is a cross section on the line 3—3 of Fig. 1; Fig. 4 is a cross section on the line 4—4 of Fig. 2.

In carrying out the present invention there is provided an axle 1 embodying parallel bars 2 separated by tubular spacers 3 through which pass rivets or other securing devices 4 engaging the bars 2 of the axle 1. Through the ends of the bars 2 pass tubular sleeves 5, supporting for vertical swinging movement, stub axles 6 located between the bars 2, the stub axles 6 carrying ground wheels 7. Through the sleeves 5 pass bolts 22, the heads 23 on the bolts 22 lying against the sleeves 5 at one end thereof and the nuts 24 on the bolts lying against the sleeves 5 at the other ends thereof, the construction, obviously, being such that, although the sleeves 5 cannot slide endwise out of the bars 2, there will be no binding of the bars 2 against the stub axles 6 under the action of the nuts 24.

Disposed between the bars 2 are arcuate racks 8 having arms 9 between which the inner ends of the stub axles 6 are located, the inner ends of the stub axles being secured to the arms 9 by means of bolts 10 or the like. Journaled for rotation in the bars 2 of the axle 1 are shafts 11 having heads 12 coacting with one of the bars. Located between the bars 2 are pinions 14 meshing into the racks 8. The pinions 14 are keyed as shown at 15 to the shafts 11. The shafts 11 are each squared as shown at 16 to hold a worm wheel 17 located exteriorly of the bars 2. Nuts 18 are threaded onto the ends of the shafts 11 and hold the worm wheels 17 in place. Meshing into the worm wheels 17 are worms 19 carried by the ends of a shaft 20 supported for rotation in bearings 21 carried by one of the bars 2 on the axle 1. Any suitable means may be provided for rotating the shaft 20. When the shaft 20 is rotated, the worms 19, meshing into the worm wheels 17, rotate the shafts 11, the shafts 11 through the instrumentality of the pinions 14 imparting a swinging movement in a vertical direction to the stub axles 6 by means of the racks 8. By the operation above described the outer end of one stub axle 6 will be swung upwardly and the outer end of the other stub axle 6 will be swung downwardly, thus permitting the ground wheels 7 to stand vertically when the vehicle of which the present axle constitutes a part is moving along a surface which is inclined transversely of the line of advance.

Having thus described the invention, what is claimed is:—

In a device of the class described, a main axle comprising spaced parts; stub axles located between the parts of the main axle; ground wheels journaled on the outer ends of the stub axles; arcuate racks carried by the inner ends of the stub axles and located between the parts of the main axle; pivot elements connecting the parts of the main axle and supporting the stub axles for vertical swinging movement; shafts disposed transversely of the axle and journaled therein; pinions on the shafts and located between the parts of the main axle, the pinions meshing into the arcuate racks; worm wheels on the shafts and located exteriorly of the axle; a second shaft supported for rotation on the main axle and extended longitudinally thereof; and worms on the second shaft, the worms meshing into the worm wheels.

In testimony that I claim the foregoing as my own, I have hereto affixed my signature in the presence of two witnesses.

IRA D. BATE.

Witnesses:
EDWARD JOHNSON,
ROBERT C. MACKIN.

Copies of this patent may be obtained for five cents each, by addressing the "Commissioner of Patents, Washington, D. C."